United States Patent
Hsieh et al.

(10) Patent No.: US 9,285,928 B2
(45) Date of Patent: Mar. 15, 2016

(54) TOUCH DETECTION METHOD AND RELATED OPTICAL TOUCH SYSTEM

(71) Applicant: Wistron Corporation, New Taipei (TW)

(72) Inventors: Chia-Ta Hsieh, New Taipei (TW); Yu-Yen Chen, New Taipei (TW); Kuo-Hsien Lu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 3 days.

(21) Appl. No.: 14/461,453

(22) Filed: Aug. 18, 2014

(65) Prior Publication Data

US 2015/0338996 A1 Nov. 26, 2015

(30) Foreign Application Priority Data

May 26, 2014 (TW) .............................. 103118307 A

(51) Int. Cl.
*G06F 3/042* (2006.01)
*G06F 3/041* (2006.01)

(52) U.S. Cl.
CPC .............. *G06F 3/0421* (2013.01); *G06F 3/041* (2013.01); *G06F 3/042* (2013.01); *G06F 3/0418* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 2010/0321309 A1* | 12/2010 | Lee ........................ | G06F 3/0421 345/173 |
| 2012/0188171 A1 | 7/2012 | Alameh | |
| 2013/0257782 A1* | 10/2013 | Nakagawa .......... | G06F 3/03542 345/173 |
| 2014/0085266 A1* | 3/2014 | Lim ........................ | G06F 3/042 345/175 |
| 2014/0104238 A1* | 4/2014 | Lu ........................... | G06F 3/042 345/175 |

* cited by examiner

*Primary Examiner* — Jason Olson
*Assistant Examiner* — Krishna Neupane
(74) *Attorney, Agent, or Firm* — Winston Hsu; Scott Margo

(57) ABSTRACT

An optical touch system includes a touch screen; a plurality of light sources for periodically emitting light; a light-emitting element for periodically emitting light when the plurality of light sources are not emitting light; a light-reflecting element, for reflecting light emitted by the plurality of light sources; a plurality of lenses, for capturing a first image during a period when the plurality of light sources are emitting light and capturing a second image during a period when the plurality of light sources are not emitting light; and a processing unit. The processing unit includes a control unit for controlling the plurality of light sources and the light-emitting element; and a computation unit for computing a first location in which the light-emitting element is located and a second location in which the light-reflecting element is located on the touch screen according to the first image and the second image.

20 Claims, 7 Drawing Sheets

TOUCH DETECTION METHOD AND RELATED OPTICAL TOUCH SYSTEM

BACKGROUND OF THE INVENTION

1. Field of the Invention

The present invention relates to a touch detection method and a related optical touch system, and more particularly, to a touch detection method and a related optical touch system capable of using light emission with time division.

2. Description of the Prior Art

Touch screens, which allow a user to perform more intuitive and convenient operations, are widely applied in various consumer electronic products. A general touch screen is composed of a display and a transparent touch board, where the transparent touch board is glued to the display in order to realize both touch and display functions. Among the applications of touch screens, one of the most popular is optical touch technology.

A modern optical touch screen uses 2 sensors for performing 2-point touch or uses 6 sensors for performing 5-point touch. FIG. 1 is a schematic diagram of the structure of a conventional optical touch screen 10. The optical touch screen 10 includes two sensors glued to the upper left corner and upper right corner of the screen, respectively, for monitoring in which positions shadows are located. When a touch occurs, the light is blocked so that shadows are generated on reflection strips (points A, B, C and D in FIG. 1 are shadows). The sensors thereby detect fragments of an optical axis sliced by shadows instead of an entire optical axis. The locations of the shadows are then sent to the system, and coordinates of the touch points can be determined via logic operations. Taking a 2-point touch as an example, a ghost point may occur when there are two touch points on the touch screen. The sensors may monitor four shadows, wherein two of these shadows are fake, since the shadow locations are utilized for determination. Wrong determination may easily occur in two-out-of-four selection. It is essential for modern optical touch screens to achieve multi-touch and ghost point filtering without increasing the number of sensors.

SUMMARY OF THE INVENTION

It is therefore an objective of the present invention to provide a touch detection method for an optical touch system to achieve multi-touch and ghost point filtering.

An embodiment of the invention discloses an optical touch system. The optical touch system comprises a touch screen; a plurality of light sources, for periodically emitting light; a light-emitting element, operated on the touch screen and periodically emitting light when the plurality of light sources are not emitting light; a light-reflecting element, operated on the touch screen and reflecting light emitted by the plurality of light sources when the plurality of light sources are emitting light; a plurality of lenses, for capturing a first image during a period when the plurality of light sources are emitting light and capturing a second image during a period when the plurality of light sources are not emitting light; and a processing unit. The processing unit comprises a control unit, for controlling the plurality of light sources and the light-emitting element to emit light or stop emitting light; and a computation unit, for computing a first location in which the light-emitting element is located on the touch screen and a second location in which the light-reflecting element is located on the touch screen according to the first image and the second image.

An embodiment of the invention further discloses a touch detection method for an optical touch system. The touch detection method comprises controlling a light-emitting element and a plurality of light sources to emit light with time division; using a light-reflecting element to reflect light emitted by the plurality of light sources and capturing a first image during a period when the plurality of light sources are emitting light; capturing a second image during a period when the light-emitting element is emitting light; and computing a first location in which the light-emitting element is located on a touch screen and a second location in which the light-reflecting element is located on the touch screen according to the first image and the second image.

An embodiment of the invention further discloses an optical touch system. The optical touch system comprises a touch screen; a plurality of light sources, for periodically emitting light; a light-emitting element, operated on the touch screen and continuously emitting light; a light-reflecting element, operated on the touch screen and reflecting light emitted by the plurality of light sources when the plurality of light sources are emitting light; a plurality of lenses, for capturing a first image during a period when the plurality of light sources are not emitting light and capturing a second image during a period when the plurality of light sources are emitting light; and a processing unit. The processing unit comprises a control unit, for controlling the plurality of light sources to periodically emit light; a comparison unit, for comparing the first image and the second image to generate a comparison result; and a determination unit, for determining the light-emitting element and the light-reflecting element according to the comparison result; wherein the first image comprises an image of the light-emitting element, and the second image comprises an image of the light-reflecting element and the image of the light-emitting element.

An embodiment of the invention further discloses a touch detection method for an optical touch system. The touch detection method comprises controlling a plurality of light sources to periodically emit light and controlling a light-emitting element to continuously emit light; using a light-reflecting element to reflect light emitted by the plurality of light sources when the plurality of light sources are emitting light; capturing a first image during a period when the plurality of light sources are not emitting light, and capturing a second image during a period when the plurality of light sources are emitting light; and comparing the first image and the second image to generate a comparison result, and determining the light-emitting element and the light-reflecting element according to the comparison result; wherein the first image comprises an image of the light-emitting element, and the second image comprises an image of the light-reflecting element and the image of the light-emitting element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
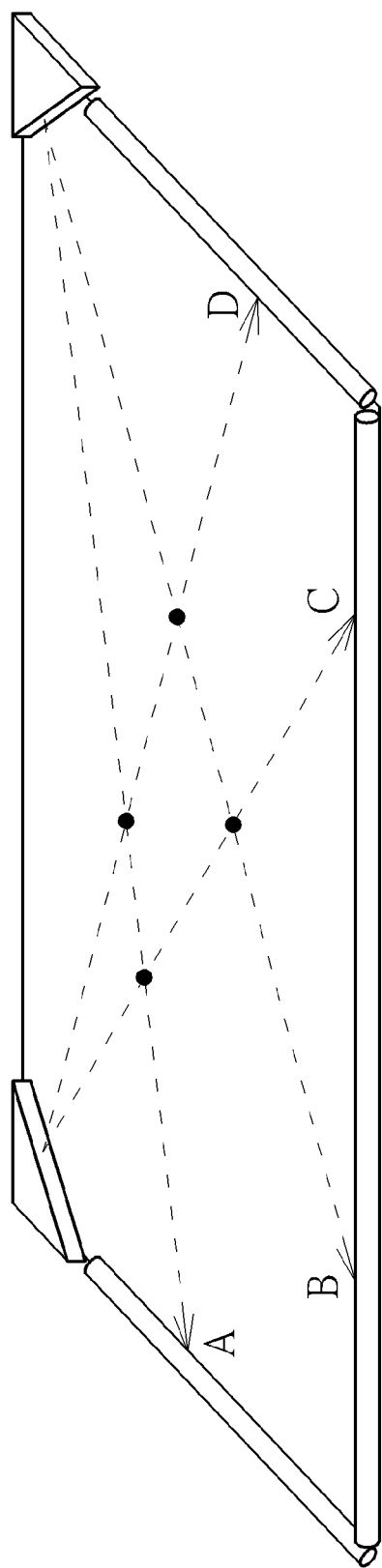
FIG. 1 is a schematic diagram of the structure of a conventional optical touch screen.
Figure 2:
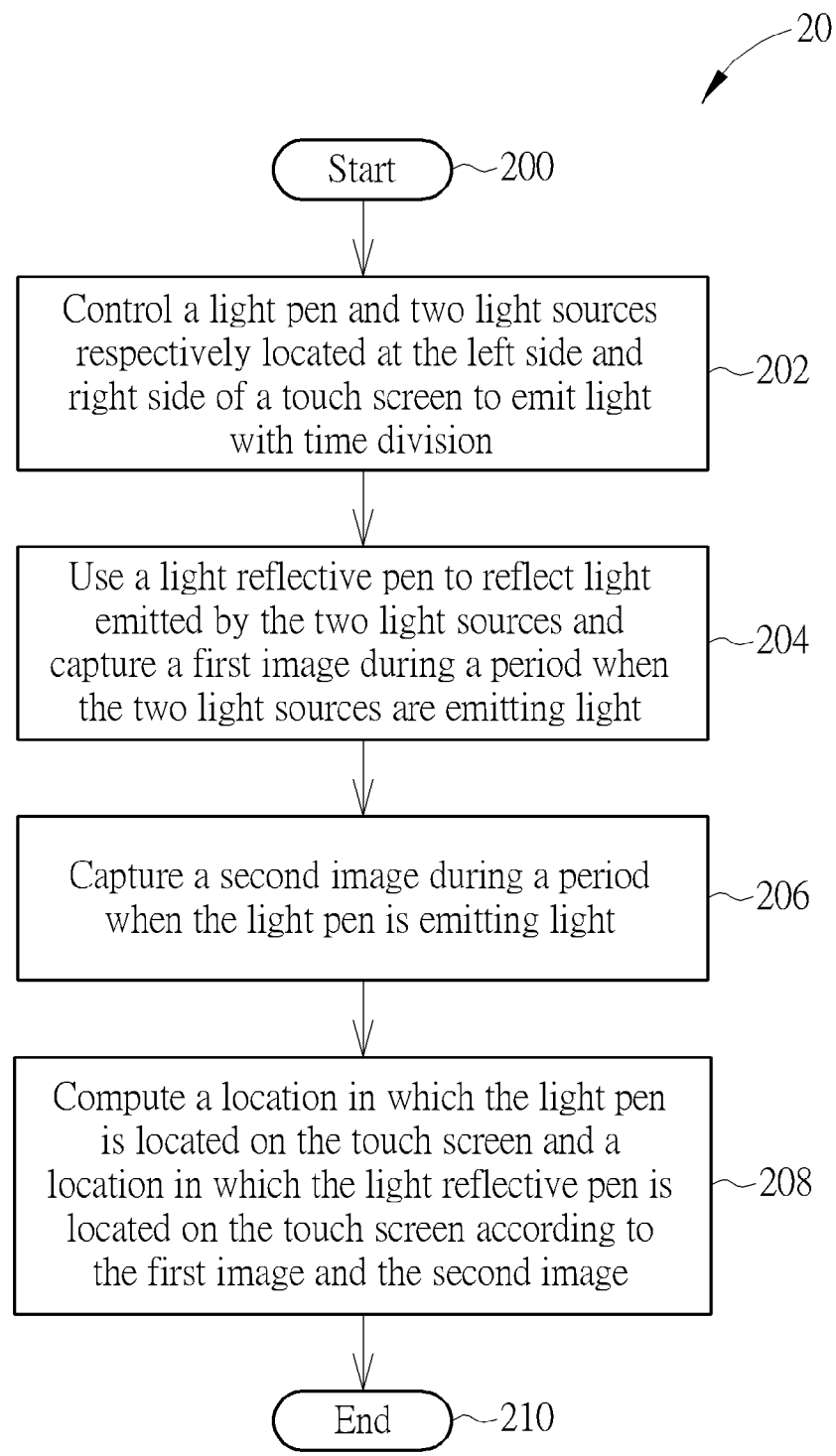
FIG. 2 is a schematic diagram of a touch detection process according to an embodiment of the invention.

Please refer to FIG. 2, which is a schematic diagram of a touch detection process 20 according to an embodiment of the invention. The touch detection process 20 may be utilized in an optical touch system, for determining and detecting multi-touch without increasing the number of optical sensors. The touch detection process 20 includes the following steps:

Step 200: Start.

Step 202: Control a light pen and two light sources respectively located at the left side and right side of a touch screen to emit light with time division.

Step 204: Use a light reflective pen to reflect light emitted by the two light sources and capture a first image during a period when the two light sources are emitting light.

Step 206: Capture a second image during a period when the light pen is emitting light.

Step 208: Compute a location in which the light pen is located on the touch screen and a location in which the light reflective pen is located on the touch screen according to the first image and the second image.

Step 210: End.

According to the touch detection process 20, the light pen and the two light sources located at the left side and right side of the touch screen periodically emit light in different time intervals. The two light sources emit light when the light pen does not, and the light pen emits light when the two light sources do not. Since the light reflective pen may reflect the light emitted by the two light sources, a voltage magnitude variation may be generated and will appear in the first image in the location of the light reflective pen, captured during the period when the two light sources are emitting light. A voltage magnitude variation may be generated and will appear in the second image in the location of the light pen, captured during the period when the light pen is emitting light. According to the voltage magnitude variation in the image of the light pen and the voltage magnitude variation in the image of the light reflective pen, the locations of the light pen and the light reflective pen on the touch screen may be computed.

By controlling the light pen and the two light sources to emit light with time division where the light pen and the light reflective pen have different structures, the touch detection process 20 can distinguish between the light pen and the light reflective pen and achieve multi-touch without increasing the number of optical sensors. Even if the light pen and the light reflective pen are used simultaneously, ghost points may not be generated. Furthermore, cost may be reduced and computational speed may be enhanced.

Figure 3:
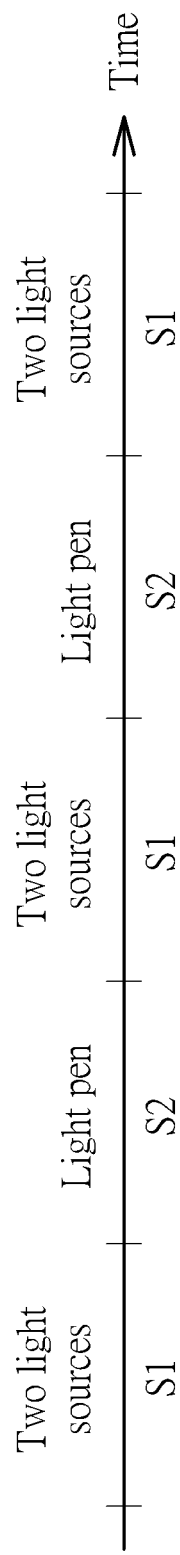
FIG. 3 is a schematic diagram of a light pen and two light sources respectively located at the left side and right side of a touch screen emitting light with time division according to an embodiment of the invention.

FIG. 3 is a schematic diagram of the light pen and the two light sources respectively located at the left side and right side of the touch screen emitting light with time division according to an embodiment of the invention. The two light sources emit light in a plurality of time slots S1, and the light pen emits light in a plurality of time slots S2. The time slots S1 and the time slots S2 are arranged alternately. When capturing images, the lens may only sense the light reflected by the light reflective pen during the time slots S1, which causes the voltage magnitude variation to be generated in the first image in the location of the light reflective pen. The lens may only sense the light emitted by the light pen during the time slots S2, which causes the voltage magnitude variation to be generated in the second image in the location of the light pen. In each time slot, the lens only senses one type of light (i.e. from the light reflective pen or the light pen).

The touch detection process 20 may further include other steps, such as establishing a wireless communication between the light-emitting element and a processing unit. Through the wireless communication between the light-emitting element and the processing unit, the light pen may be controlled to periodically emit light. The wireless communication may use technologies such as Bluetooth, Wi-Fi and near field communication (NFC), but is not limited herein. The touch detection process 20 may also adjust a frequency of image capture according to light emission frequencies of the light-emitting element and the two light sources.

Figure 4:
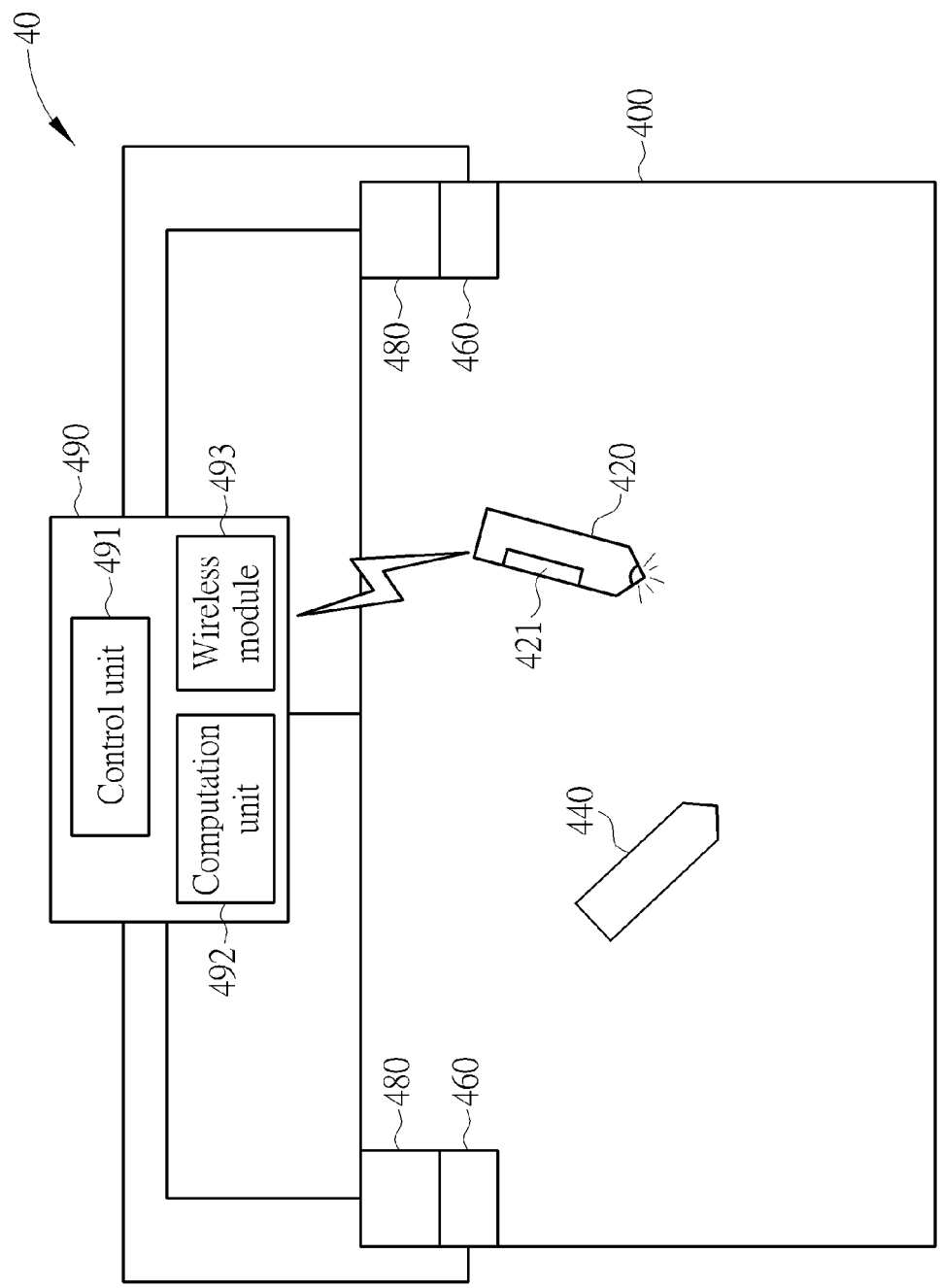
FIG. 4 is a schematic diagram of an optical touch system according to an embodiment of the invention.

Detailed implementations of the touch detection process 20 are illustrated in FIG. 4, which is a schematic diagram of an optical touch system 40 according to an embodiment of the invention. The optical touch system 40 includes a touch screen 400, a light-emitting element 420, a light-reflecting element 440, two light sources 460, two lenses 480 and a processing unit 490. The two light sources 460 may be disposed in the upper left corner and the lower right corner of the touch screen 400 respectively, for periodically emitting light. The two lenses 480 may also be disposed in the upper left corner and the lower right corner of the touch screen 400 respectively, for capturing a first image during a period when the two light sources 460 emit light and capturing a second image during a period when the two light sources 460 do not emit light. Preferably, the two light sources 460 may be integrated into the two lenses 480. The light-emitting element 420 may be operated on the touch screen 400 and periodically emit light when the two light sources 460 do not emit light. Preferably, the light-emitting element 420 may be a light pen. The light-emitting element 420 may include a wireless module 421. The wireless module 421 is utilized for establishing a wireless communication with the processing unit 490. The wireless communication may use technologies such as Bluetooth, Wi-Fi and NFC, and is not limited herein. The light-reflecting element 440 may be operated on the touch screen 400 and reflect light emitted by the two light sources 460 when the two light sources 460 emit light.

The processing unit 490 may include a control unit 491, a computation unit 492 and a wireless module 493. The control unit 491 is utilized for controlling the two light sources 460 and the light-emitting element 420 to emit light or stop emitting light. The computation unit 492 is utilized for computing a first location in which the light-emitting element 420 is located on the touch screen 400 and a second location in which the light-reflecting element 440 is located on the touch screen 400 according to the first image and the second image. The wireless module 493 is utilized for establishing the wireless communication with the wireless module 421. Note that the optical touch system 40 uses two light sources and two lenses as an example, but the numbers of light sources and lenses should not be limited herein.

The wireless module 493 and the wireless module 421 initially establish the wireless communication between the processing unit 490 and the light-emitting element 420. The control unit 491 then controls the light-emitting element 420 to emit light periodically via the wireless communication. When the control unit 491 controls the two light sources 460 to emit light, the light reflective pen 440 may reflect the light emitted by the two light sources 460, so that the two lenses 480 may only sense the light reflected by the light reflective pen 440 during the period when the two light sources 460 are emitting light. This results in voltage magnitude variation in the first image in the location of the image of the light reflective pen 440. When the control unit 491 controls the two light sources 460 not to emit light, the two lenses 480 may only sense the light emitted by the light pen 420, which results in voltage magnitude variation in the second image in the location of the image of the light pen 420. The processing unit 490 may compute the location of the light reflective pen 440 on the touch screen 400 according to the voltage magnitude variation in the image of the light reflective pen 440, and compute the location of the light pen 420 on the touch screen 400 according to the voltage magnitude variation in the image of the light pen 420. The processing unit 490 can thereby control the light pen 420 and the two light sources 460 to emit light with time division where the light pen 420 and the light reflective pen 460 have different structures; this achieves multi-touch and prevents occurrences of ghost points.

Figure 5:
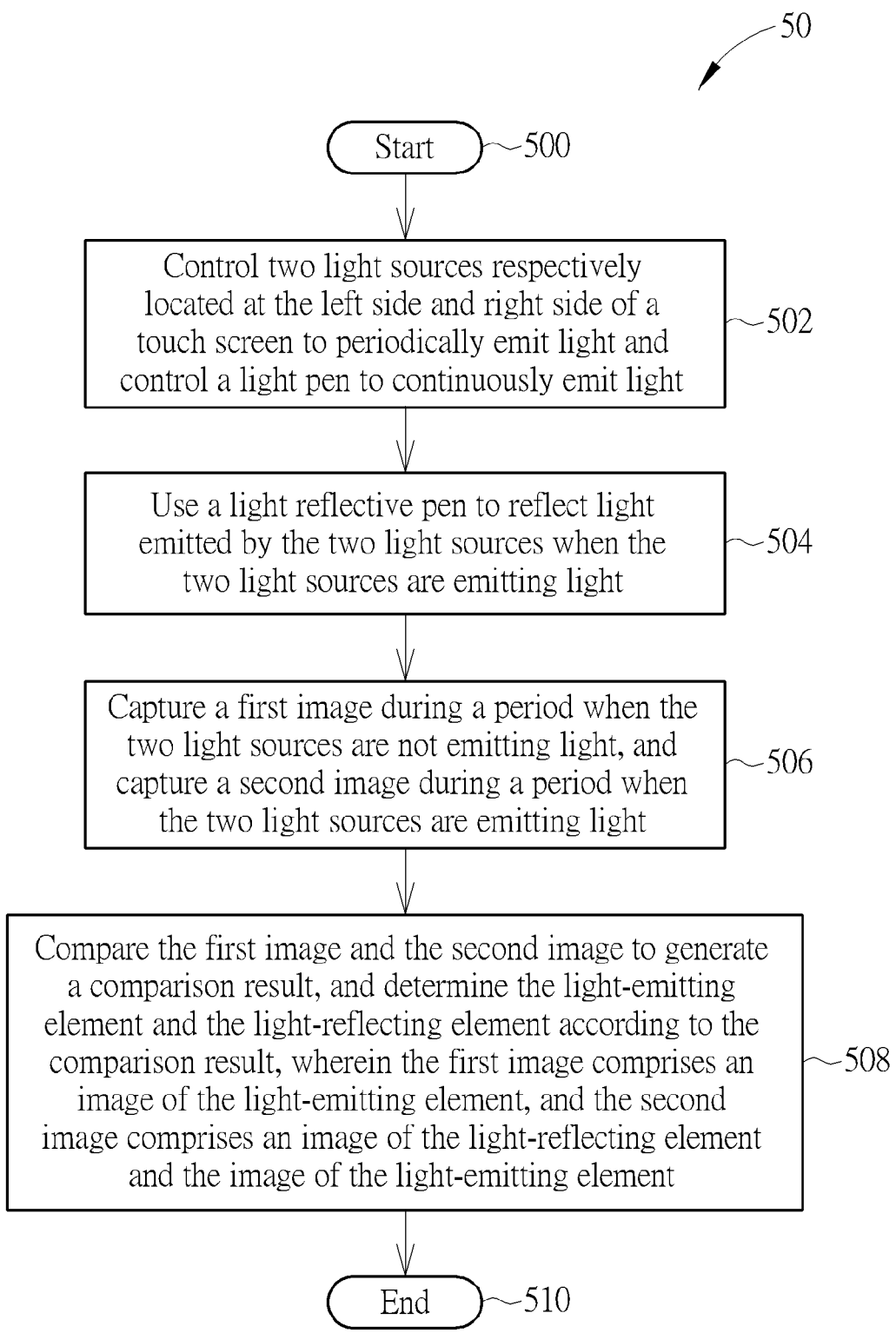
FIG. 5 is a schematic diagram of a touch detection process according to an embodiment of the invention.

FIG. 5 is a schematic diagram of a touch detection process 50 according to an embodiment of the invention. The touch detection process 50 may be utilized in an optical touch system, for determining and detecting multi-touch without increasing the number of optical sensors. The touch detection process 50 includes the following steps:

Step 500: Start.

Step 502: Control two light sources respectively located at the left side and right side of a touch screen to periodically emit light and control a light pen to continuously emit light.

Step 504: Use a light reflective pen to reflect light emitted by the two light sources when the two light sources are emitting light.

Step 506: Capture a first image during a period when the two light sources are not emitting light, and capture a second image during a period when the two light sources are emitting light.

Step 508: Compare the first image and the second image to generate a comparison result, and determine the light-emitting element and the light-reflecting element according to the comparison result, wherein the first image comprises an image of the light-emitting element, and the second image comprises an image of the light-reflecting element and the image of the light-emitting element.

Step 510: End.

According to the touch detection process 50, the light pen emits light continuously, thus the lens may sense light emitted by the light pen in each time slot and the image of the light pen may exist in both the first image and the second image. Since the light reflective pen may only perform reflection when the two light sources respectively located at the left side and right side of the touch screen are emitting light, the image of the light reflective pen only exists in the second image. When the comparison result indicates that an object does not move or moves by a distance smaller than a threshold value between the first image and the second image (where the user may move the light pen), the object is determined to be the light pen. When the comparison result indicates that an object appears in only one of the first image and the second image, the object is determined to be the light reflective pen. The touch detection process 50 distinguishes between the light pen and the light reflective pen by comparing the difference between the first image and the second image. Even if the light pen and the light reflective pen are used simultaneously, ghost points may not be generated. Furthermore, cost may be reduced and computational speed may be enhanced.

Figure 6:
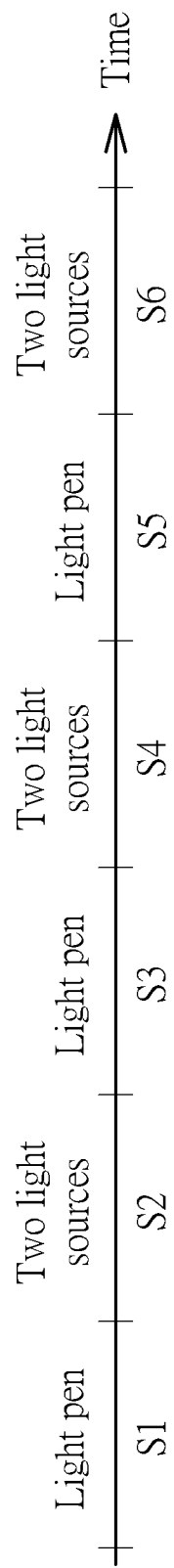
FIG. 6 is a schematic diagram of the light pen continuously emitting light and the two light sources periodically emitting light according to an embodiment of the invention.

FIG. 6 is a schematic diagram of the light pen continuously emitting light and the two light sources periodically emitting light according to an embodiment of the invention. The light pen continuously emits light in time slots S1, S2, S3, S4, S5 and S6, and the two light sources in the left side and right side of the touch screen only emit light in the time slots S2, S4 and S6. When capturing images, the lens may only sense the light emitted by the light pen in the time slots S1, S3 and S5; hence, the captured first image only includes the image of the light pen. The lens may sense the light emitted by the light pen and the light reflected by the light reflective pen in the time slots S2, S4 and S6; hence, the captured second image includes the image of the light pen and the image of the light reflective pen. An image appears in the same location in the first image and the second image or moves by a distance smaller than a threshold value between the first image and the second image is the light pen, while an image appears only in the second image is the light reflective pen.

In addition, the touch detection process 20 may further include a step of adjusting a frequency of image capture according to the light emission frequency of the two light sources, in order to prevent both the first image and the second image from being captured during the period when the two light sources are not emitting light or when the two light sources are emitting light.

Figure 7:
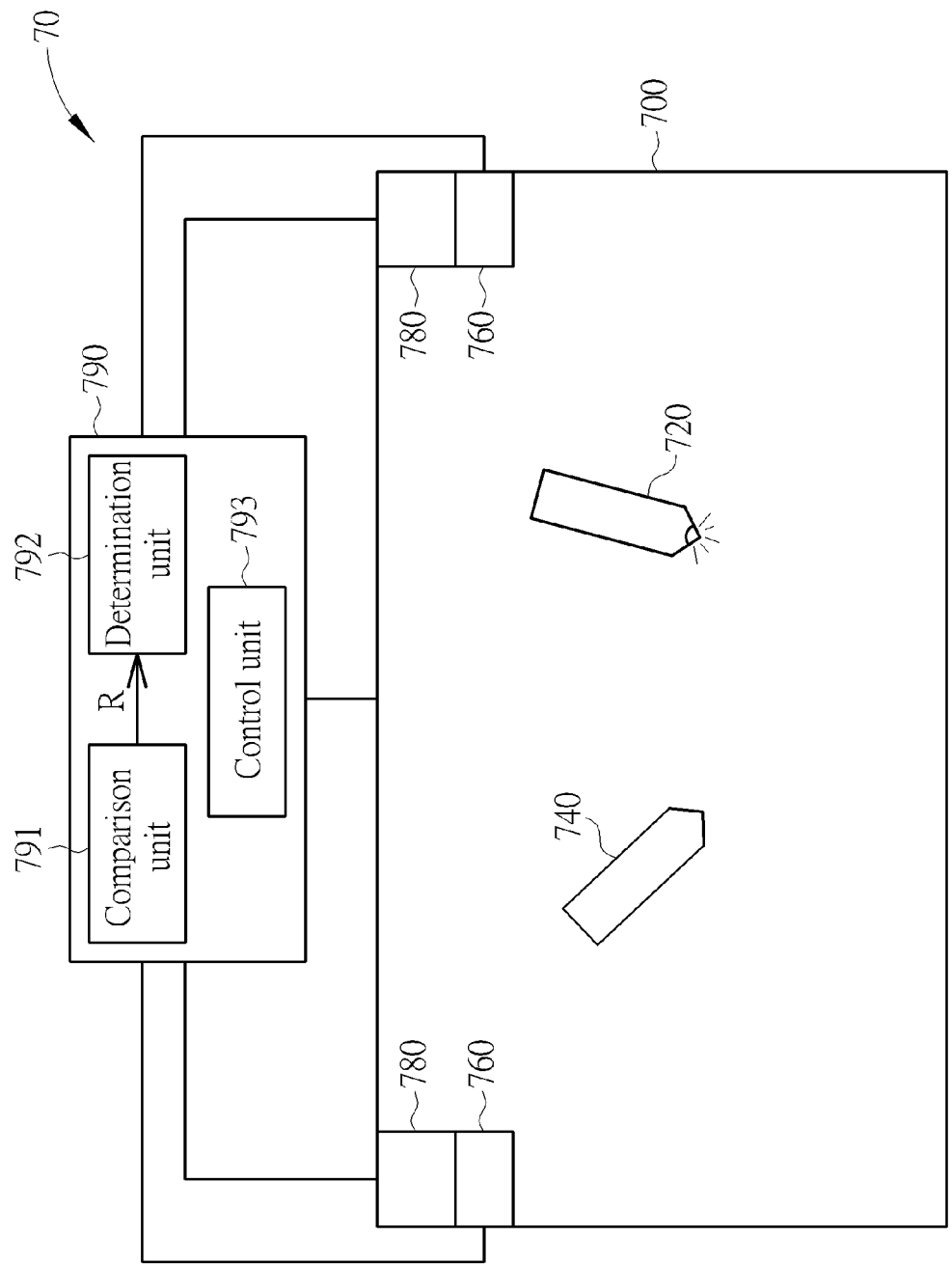
FIG. 7 is a schematic diagram of an optical touch system according to an embodiment of the invention.

Detailed implementations of the touch detection process 50 are illustrated in FIG. 7, which is a schematic diagram of an optical touch system 70 according to an embodiment of the invention. The optical touch system 70 includes a touch screen 700, a light-emitting element 720, a light-reflecting element 740, two light sources 760, two lenses 780 and a processing unit 790. The two light sources 760 may be disposed in the upper left corner and the lower right corner of the touch screen 700 respectively, for periodically emitting light. The two lenses 780 may also be disposed in the upper left corner and the lower right corner of the touch screen 700 respectively, for capturing a first image during a period when the two light sources 760 are not emitting light and capturing a second image during a period when the two light sources 760 are emitting light. Preferably, the two light sources 760 may be integrated into the two lenses 780. The light-emitting element 720 may be a light pen, which may be operated on the touch screen 700 and continuously emit light. The light-reflecting element 740 may be a light reflective pen, which may be operated on the touch screen 700 and reflect light emitted by the two light sources 760 when the two light sources 760 are emitting light.

The processing unit 790 includes a comparison unit 791, a determination unit 792 and a control unit 793. The control unit 793 is utilized for controlling the two light sources 760 to periodically emit light. The comparison unit 791 is utilized for comparing the first image and the second image to generate a comparison result R. The determination unit 792 may determine the light-emitting element 720 and the light-reflecting element 740 according to the comparison result R. Note that the optical touch system 70 uses two light sources and two lenses as an example, but the numbers of light sources and lenses should not be limited herein.

The control unit 793 controls the two light sources 760 to periodically emit light. When the two light sources 760 are not emitting light, the two lenses 780 may only sense the light emitted by the light pen 720; hence, the first image is only affected by the light pen 720. When the two light sources 760 are emitting light, the two lenses 780 may sense the light reflected by the light reflective pen 740 and the light emitted by the light pen 720; hence, the second image includes both the image of the light pen and the image of the light reflective pen. The comparison unit 791 compares the first image and the second image to generate the comparison result R. When the comparison result R indicates that an object does not move or moves by a distance smaller than a threshold value between the first image and the second image, the determination unit 792 determines that the object is the light pen 720. When the comparison result R indicates that an object appears in only one of the first image and the second image, the determination unit 792 determines that the object is the light reflective pen 740. The optical touch system 70 can thereby distinguish between the light pen and the light reflective pen by comparing the difference between the first image and the second image. Even if the light pen and the light reflective pen are used simultaneously, ghost points may not be generated. Furthermore, cost may be reduced and computational speed may be enhanced.

To sum up, a first embodiment of the present invention controls the light sources and the light-emitting element to emit light with time division and uses the light element and the light-reflecting element having different structures, to achieve multi-touch determination and detection. A second embodiment of the present invention distinguishes between the light pen and the light reflective pen by comparing the light at two time points, to further achieve multi-touch determination and detection. Both embodiments can filter out ghost points without increasing the number of sensors, which achieves the objective of cost saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch system, comprising:
    a touch screen;
    a plurality of light sources, for periodically emitting light;
    a light pen, for performing touch operations on the touch screen and periodically emitting light when the plurality of light sources are not emitting light;
    a light-reflecting element, operated on the touch screen and reflecting light emitted by the plurality of light sources when the plurality of light sources are emitting light;
    a plurality of lenses, for capturing a first image during a period when the plurality of light sources are emitting light and capturing a second image during a period when the plurality of light sources are not emitting light; and
    a processing unit, comprising:
        a control unit, for controlling the plurality of light sources and the light pen to emit light or stop emitting light; and
        a computation unit, for computing a first location in which the light pen is located on the touch screen and a second location in which the light-reflecting element is located on the touch screen according to the first image and the second image.

2. The optical touch system of claim 1, wherein a voltage magnitude variation is generated in an image of the light-reflecting element in the first image during a period when the light-reflecting element is reflecting light emitted by the plurality of light sources.

3. The optical touch system of claim 2, wherein the processing unit computes that the light-reflecting element is located in the second location on the touch screen according to the voltage magnitude variation.

4. The optical touch system of claim 1, wherein a voltage magnitude variation is generated in an image of the light in the second image during a period when the light pen is emitting light.

5. The optical touch system of claim 2, wherein the processing unit computes that the light pen is located in the first location on the touch screen according to the voltage magnitude variation.

6. The optical touch system of claim 1, wherein the light pen further comprises a wireless module, for establishing a wireless communication with the processing unit.

7. The optical touch system of claim 1, wherein the processing unit controls the plurality of light sources to emit light in a plurality of first time slots, and controls the light pen to emit light in a plurality of second time slots, wherein the plurality of first time slots and the plurality of second time slots are arranged alternately.

8. A touch detection method for an optical touch system, the touch detection method comprising:
    controlling a light pen having touch operation capability and a plurality of light sources to emit light with time division;
    using a light-reflecting element to reflect light emitted by the plurality of light sources and capturing a first image during a period when the plurality of light sources are emitting light;
    capturing a second image during a period when the light pen is emitting light; and
    computing a first location in which the light pen is located on a touch screen and a second location in which the light-reflecting element is located on the touch screen according to the first image and the second image.

9. The touch detection method of claim 8, further comprising generating a voltage magnitude variation in an image of the light-reflecting element during a period when the light-reflecting element is reflecting light emitted by the plurality of light sources.

10. The touch detection method of claim 9, wherein computing the second location in which the light-reflecting element is located on the touch screen according to the image of the light-reflecting element comprises computing the second location in which the light-reflecting element is located on the touch screen according to the voltage magnitude variation.

11. The touch detection method of claim 8, further comprising generating a voltage magnitude variation in an image of the light pen during the period when the light pen is emitting light.

12. The touch detection method of claim 11, wherein computing the first location in which the light pen is located on the touch screen according to the image of the light pen comprises computing the first location in which the light pen is located on the touch screen according to the voltage magnitude variation.

13. The touch detection method of claim 8, further comprising establishing a wireless communication between the light pen and a processing unit.

14. The touch detection method of claim 8, wherein controlling the light pen and the plurality of light sources to emit light with time division comprises controlling the plurality of light sources to emit light in a plurality of first time slots and controlling the light pen to emit light in a plurality of second time slots, wherein the plurality of first time slots and the plurality of second time slots are arranged alternately.

15. An optical touch system, comprising:
    a touch screen;
    a plurality of light sources, for periodically emitting light;
    a light pen, for performing touch operations on the touch screen and continuously emitting light;
    a light-reflecting element, operated on the touch screen and reflecting light emitted by the plurality of light sources when the plurality of light sources are emitting light;

a plurality of lenses, for capturing a first image during a period when the plurality of light sources are not emitting light and capturing a second image during a period when the plurality of light sources are emitting light; and a processing unit, comprising:
- a control unit, for controlling the plurality of light sources to periodically emit light;
- a comparison unit, for comparing the first image and the second image to generate a comparison result; and
- a determination unit, for determining locations of the light pen and the light-reflecting element according to the comparison result;

wherein the first image comprises an image of the light pen, and the second image comprises an image of the light-reflecting element and the image of the light pen.

16. The optical touch system of claim 15, wherein the processing unit determines that an object is the light pen when the comparison result indicates that the object does not move or moves by a distance smaller than a threshold value between the first image and the second image.

17. The optical touch system of claim 15, wherein the processing unit determines that an object is the light-reflecting element when the comparison result indicates that the object appears in only one of the first image and the second image.

18. A touch detection method, for an optical touch system, the touch detection method comprising:

controlling a plurality of light sources to periodically emit light and controlling a light pen having touch operation capability to continuously emit light;

using a light-reflecting element to reflect light emitted by the plurality of light sources when the plurality of light sources are emitting light;

capturing a first image during a period when the plurality of light sources are not emitting light, and capturing a second image during a period when the plurality of light sources are emitting light; and comparing the first image and the second image to generate a comparison result, and determining locations of the light pen and the light-reflecting element according to the comparison result;

wherein the first image comprises an image of the light pen, and the second image comprises an image of the light-reflecting element and the image of the light pen.

19. The touch detection method of claim 18, wherein determining locations of the light pen and the light-reflecting element according to the comparison result comprises determining that an object is the light pen when the comparison result indicates that the object does not move or moves by a distance smaller than a threshold value between the first image and the second image.

20. The touch detection method of claim 18, wherein determining locations of the light pen and the light-reflecting element according to the comparison result comprises determining that an object is the light-reflecting element when the comparison result indicates that the object appears in only one of the first image and the second image.

* * * * *